United States Patent Office 3,838,117
Patented Sept. 24, 1974

---

3,838,117
1,4,5-BENZOTRIAZOCINE DERIVATIVES
Minoru Shindo, Tokyo, Morio Kakimoto, Yono, and Hiroyuki Nagano, Ageo, Japan, assignors to Chugai Seiyaku Kabushiki Kaisha, Tokyo, Japan
No Drawing. Filed Apr. 10, 1972, Ser. No. 242,824
Claims priority, application Japan, Apr. 8, 1971, 46/21,421, 46/21,422, 46/21,423, 46/21,428
Int. Cl. C07d 55/54
U.S. Cl. 260—239.3 B                4 Claims

---

ABSTRACT OF THE DISCLOSURE 1,4,5-benzotriazocine derivatives which possess an activity on the central nervous system are disclosed. The benzotriazocine derivatives are prepared by the reaction of a benzophenone derivative with a halogenoacetyl halide or the cyclization of a benzophenone derivative.

---

This invention relates, in one aspect, to 1,4,5-benzotriazocine derivatives or their salts, said derivatives being represented by the general formula:

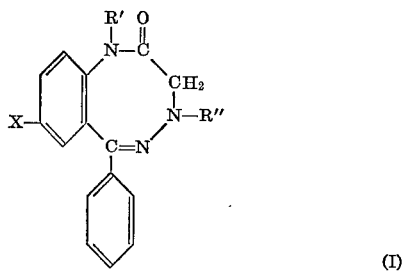

(I)

(wherein X is hydrogen, halogen or an alkyl group; R' is hydrogen or an alkyl group; R" is hydrogen, —COCH$_2$Y or —COCH$_2$A, where Y is halogen, A is a nitrogen atom having two or three of R$_1$, R$_2$ and R$_3$ and carrying, when three of them are involved, an anion; R$_1$, R$_2$ and R$_3$ are the same or different and each represents hydrogen, alkyl, alkenyl, substituted or unsubstituted aryl or aralkyl or substituted amino, or 2 or 3 of them being taken together, forms a polymethylene group having one or more heteroatoms therebetween) and, in another aspect, to a process for producing said derivatives or salts.

In the above general formula, the halogen designated by X or Y is chlorine, bromine, fluorine or iodine. The alkyl X, R', R$_1$, R$_2$ or R$_3$ may be either straight-chain or branched and, for example, may be methyl, ethyl, propyl, isopropyl, butyl or isobutyl. The group denoted by the formula —COCH$_2$—A is a primary, secondary or tertiary aminoacetyl or ammonium acetyl group, exemplary species including aminoacetyl, methylaminoacetyl, dimethylaminoacetyl, trimethylammoniumacetyl and the like. The aminoacetyl or ammoniumacetyl group represented by the above formula includes not only the above-mentioned species originating from alkylamines but also the aminoacetyl or ammoniumacetyl groups derived from primary to tertiary amines of substituted or unsubstituted aryls or aralkyls, cyclic secondary or tertiary amines such as piperidine, pyrimidine, pyrrolidine, morpholine, piperazine, hexamethylenetetraamine, etc., substituted hydrazine, secondary or tertiary alkynylalkylamine, arylalkylamine, arylalkenylamine, aralkylalkylamine, aralkylalkenylamine, or cyclic tertiary amines having substituents on the nitrogen atom such as N-methylpiperidine and the like.

Thus, among compounds of the above general formula (I) are:

8-Chloro-3,4-dihydro-1-methyl-6-phenyl-1,4,5-benzotriazocin-2(1H)-one 3,4-Dihydro-6-phenyl-1,4,5-benzotriazocin-2(1H)-one
8-Bromo-3,4-dihydro-1-methyl-6-phenyl-1,4,5-benzotriazocin-2(1H)-one
8-Fluoro-3,4-dihydro-6-phenyl-1,4,5-benzotriazocin-2(1H)-one
3,4-Dihydro-1,8-dimethyl-6-phenyl-1,4,5-benzotriazocin-2(1H)-one
3,4-Dihydro-1-methyl-8-iodo-6-phenyl-1,4,5-benzotriazocin-2(1H)-one
8-Chloro-3,4-dihydro-1-methyl-6-phenyl-1,4-bromoacetyl-1,4,5-benzotriazocin-2(1H)-one
3,4-Dihydro-6-phenyl-4-bromoacetyl-1,4,5-benzotriazocin-2(1H)-one
8-Bromo-3,4-dihydro-1-methyl-6-phenyl-4-bromoacetyl-1,4,5-benzotriazocin-2(1H)-one
8-Fluoro-3,4-dihydro-6-phenyl-4-bromoacetyl-1,4,5-benzotriazocin-2(1H)-one
3,4-Dihydro-1,8-dimethyl-6-phenyl-4-bromoacetyl-1,4,5-benzotriazocin-2(1H)-one
3,4-Dihydro-1-methyl-6-phenyl-4-chloroacetyl-1,4,5-benzotriazocin-2(1H)-one
3,4-Dihydro-4-aminoacetylamino-6-phenyl-1,4,5-benzotriazocin-2(1H)-one
8-Chloro-3,4-dihydro-4-methylaminoacetyl-1-methyl-6-phenyl-1,4,5-benzotriazocin-2(1H)-one
8-Bromo-3,4-dihydro-4-(diethylamino)acetyl-1-methyl-6-phenyl-1,4,5-benzotriazocin-2(1H)-one
8-Fluoro-3,4-dihydro-4-(phenylamino)acetyl-1-methyl-6-phenyl-1,4,5-benzotriazocin-2(1H)-one
8-Methyl-3,4-dihydro-4-(2',5'-dimethylphenylamino)-acetyl-6-phenyl-1,4,5-benzotriazocin-2(1H)-one
3,4-Dihydro-4-piperidinoacetyl-6-phenyl-1,4,5-benzotriazocin-2(1H)-one
8-Chloro-3,4-dihydro-4-piperazinoacetyl-1-methyl-6-phenyl-1,4,5-benzotriazocin-2(1H)-one
8-Bromo-3,4-dihydro-4-(4'-methoxyphenylamino)acetyl-6-phenyl-1,4,5-benzotriazocin-2(1H)-one
8-Chloro-3,4-dihydro-4-(allylamino)acetyl-6-phenyl-1,4,5-benzotriazocin-2(1H)-one
8-Fluoro-3,4-dihydro-4-(diallylamino)acetyl-6-phenyl-1,4,5-benzotriazocin-2(1H)-one
3,4-Dihydro-4-(diethylamino)acetyl-6-phenyl-8-iodo-1,4,5-benzotriazocin-2(1H)-one
3,4-Dihydro-4-(phenylamino)acetyl-1-methyl-6-phenyl-1,4,5-benzotriazocin-2(1H)-one
8-Fluoro-3,4-dihydro-4-(2',6'-diethylphenylamino)acetyl-6-phenyl-1,4,5-benzotriazocin-2(1H)-one
8-Chloro-3,4-dihydro-4-(methylethylamino)acetyl-1-methyl-6-phenyl-1,4,5-benzotriazocin-2(1H)-one
3,4-Dihydro-4-phenylhydrazinoacetyl-6-phenyl-1,4,5-benzotriazocin-2(1H)-one
8-Methyl-3,4-dihydro-4-(diethylamino)acetyl-6-phenyl-1,4,5-benzotriazocin-2(1H)-one
3,4-Dihydro-4-(4'-methylphenylamino)acetyl-1,8-dimethyl-6-phenyl-1,4,5-benzotriazocin-2(1H)-one
3,4-Dihydro-4-(1-phenylethylamino)acetyl-1,8-dimethyl-6-phenyl-1,4,5-benzotriazocin-2(1H)-one
8-Chloro-3,4-dihydro-4-(benzylamino)acetyl-6-phenyl-1,4,5-benzotriazocin-2(1H)-one
8-Fluoro-3,4-dihydro-4-(1-phenylethylamino)acetyl-1-methyl-6-phenyl-1,4,5-benzotriazocin-2(1H)-one
8-Bromo-3,4-dihydro-4-piperazinoacetyl-1-methyl-6-phenyl-1,4,5-benzotriazocin-2(1H)-one
8-Fluoro-3,4-dihydro-4-(phenylhydrazino)acetyl-6-phenyl-1,4,5-benzotriazocin-2(1H)-one
8-Methyl-3,4-dihydro-4-pyrrolidinoacetyl-6-phenyl-1,4,5-benzotriazocin-2(1H)-one
8-Fluoro-3,4-dihydro-4-pyrrolidinoacetyl-6-phenyl-1,4,5-benzotriazocin-2(1H)-one
[(8-Bromo-3,4-dihydro-2-oxo-6-phenyl-1-methyl-1,4,5-benzotriazocin-4-yl)carbonylmethyl]hexamethylene tetraminium monobromide

[(8-Chloro-3,4-dihydro-2-oxo-6-phenyl-1,4,5-benzotriazocin-4-yl)carbonylmethyl]triethylammonium monobromide

[(8-Fluoro-3,4-dihydro-1-methyl-2-oxo-6-phenyl-1,4,5-benzotriazocin-4-yl)carbonylmethyl]trimethylammonium monobromide

[(8-Chloro-3,4-dihydro-2-oxo-6-phenyl-1,4,5-benzotriazocin-4-yl)carbonylmethyl]methyl pyrrolidinium monobromide

[(8-Methyl-3,4-dihydro-2-oxo-6-phenyl-1,4,5-benzotriazocin-4-yl)carbonylmethylmethyl](diallyl)methylammonium bromide

[(3,4-Dihydro-2-oxo-1,8-dimethyl-6-phenyl-1,4,5-benzotriazocin-4-yl)carbonylmethyl]hexamethylenetraminium monobromide.

The compounds represented by general formula (I) are invariably novel compounds which, by virtue of their action upon the central nervous system, are of use as medicines.

The compounds represented by the formula (I) have a neurotropic activity. Particularly, they act to depress the central nervous system and, therefore, are useful as sedative, tranquilizer, antidepressant, antispastic and analgesic compound. Further, these compounds were found to have a low toxicity. Depressive effect on the central nervous system of the compounds can be determined according to the method disclosed by W. L. Kuhn et al. "Journal of Pharmacology and Experimental Therapeutics," 134, 60 (1961), wherein the degree of depression is determined by observing the sleeping time in mice prolonged by the oral administration of these compounds followed by intaperitoneal injection of soluble hexobarbital (sodium salt of hexobarbital).

Analgesic activity of the compounds was determined either by the Electro-Stimulation Method of J. H. Burn et al. "Biological Standardization," Oxford Univ. Press (1950), wherein these compounds are orally administered to mice followed by subjecting to electric stimulation. and counting the number of times stimulation is effected until the mice squeak, or by Acetic Acid Writhing Method according to R. Koster et al., "Federation Proceedings," 18, 412 (1969), wherein the compounds are orally administered to mice, then acetic acid is intraperitoneally injected into the mice and the decrease in depression of writhing of the mice caused by the intraperitoneal injection of acetic acid is observed.

Toxicity is measured by the oral administration of the compounds to mice followed by measuring a lethal dose which is indicated by "$LD_{50}$."

The results exhibit that all the compounds represented by the formula (I) are effective and have low toxicity. Some of the compounds are especially effective in prolonging central nervous system depression time (sleeping time); the depression time is 1.5 to 4 times that of the control, when they are administered in the level of 5 to 20 mg./kg. With respect to analgesic action, some of the compounds were found to have about 2 times the depression ratio in comparison with the control group by the Electro-Stimulation Method as determined 45 to 90 minutes after administration of 100 mg./kg. On the other hand, more than 70% of depression ratio is observed according to the Acetic Acid Writhing Method.

Acute toxicity is observed with doses of 600 to 1500 mg./kg. ($LD_{50}$).

The compounds represented by the formula (I) may be administered orally, intravenously or subcutaneously. if necessary, in the form of organic or inorganic acid addition salts. Though therapeutic dosage level of the compounds may be varied depending upon specific activity of the compounds and specific requirement, the dosage level is usually from 1 to 100 mg./kg. per each administration to a warm blooded animal. The compounds of this invention may be administered in the form of isotonic solution, elixir, suspension, capsule, tablet or powder which may be prepared by incorporating the compounds into usual solid or liquid carriers or excipients according to the conventional pharmaceutical practice.

It is the object of this invention to provide compounds which, as aforesaid, are new and useful as medicines.

Referring, now, to said general formula (I), the compounds in which R″ is hydrogen, i.e. the 1,4,5-benzotriazocine derivatives represented by the general formula:

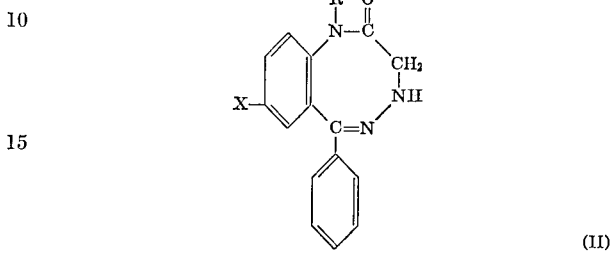

(II)

(wherein X is hydrogen, halogen or an alkyl group; R′ is hydrogen or an alkyl group) can be produced by reacting a 4-acylbenzotriazocine derivative of general formula:

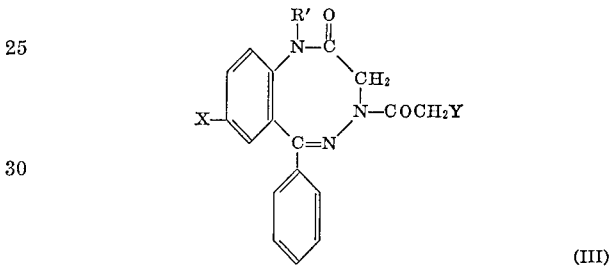

(III)

(wherein X and R′ are as previously defined; Y is halogen) with a deacylating agent.

The said deacylating agent is preferably an organic or inorganic basic substance, exemplary deacylating agents including organic amines, alcoholates, ammonia and the including organic amines, alcoholates, ammonia and its basic salts, inorganic hydroxides and their basic salts.

Organic amines and alcoholates are particularly preferred because of their adequate solubilities in various solvents. For example, aminopyridines, thiourea and sodium alcoholate are especially useful.

The reaction is preferably carried out in a solvent which may for example be chloroform, methylene chloride or benzene. While the reaction proeceds at room temperature, it may be accelerated by heating.

The desired compound can be easily separated from the reaction mixture by a usual procedure. For example, when the reaction mixture contains the deacylating agent, the latter is first removed and the residue is concentrated. Then, the concentrate is cooled or treated with ether. One may subject the concentrate to column chromatography.

Referring, further, to said general formula (I), the compound in which R″ is —COCH$_2$A, i.e., the 1,4,5-benzotriazocine derivatives represented by general formula:

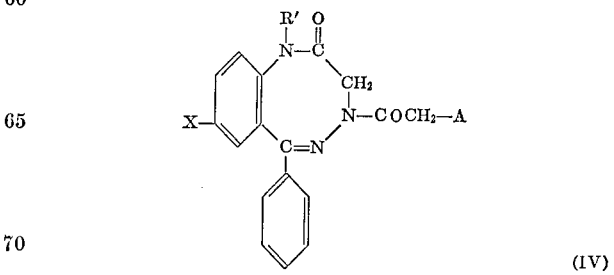

(IV)

(wherein X and R′ are as previously defined; A is a nitrogen atom having two or three of R$_1$, R$_2$ and R$_3$ and, when three of them are involved, carrying an anion, where R$_1$, R$_2$ and R$_3$ are the same or different and each represents hydrogen, alkyl, alkenyl, substituted or unsubstituted aryl or aralkyl or substituted amino, or, two or three of them being taken together, a polymethylene group which may have one or more hetero-atoms therebetween) can be produced by reacting an 4-acylbenzotriazocine derivative (III) with an amine of said general formula:

(V)

(wherein $R_1$, $R_2$ and $R_3$ are the same or different and each represents hydrogen, alkyl, alkenyl, substituted or unsubstituted aryl or aralkyl or substituted amino, or, two or three of them being taken together, a polymethylene group which may have one or more hetero-atoms therebetween).

The reaction of a compound of general formula (III) with a compound of general formula (V) can be conducted in the presence or absence of a solvent, though, to control the reaction or carry out the reaction smoothly, it is preferable to employ a solvent. The solvent mentioned just above may for example be chloroform, carbon tetrachloride, methylene chloride, benzene or alcohol. While the reaction proceeds at room temperature of at a lower or elevated temperature, it is in many cases preferable to carry out the reaction at room temperature or under heating. The proportion of the reactants may be equimolar, but improved yields are sometimes attained when one of the reactants, for example the amine of general formula (V) is used in excess.

The desired compound can be easily separated from the reaction mixture by procedures which are conventional per se. Thus, when the unreacted amine remains in the reaction mixture, the mixture is treated with water or acid, e.g. hydrochloric acid to remove the amine and, then, extracted with an organic solvent. The extract can be purified as required by chromatography on silica gel.

The compounds of general formula (I) in which R″ is —COCH$_2$Y, i.e. the 1,4,5-benzotriazocine derivatives of said general formula (III), can be produced by cyclizing the benzophenone derivative of general formula:

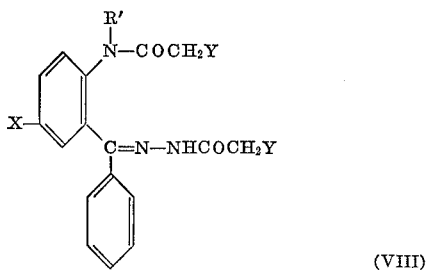
(VIII)

(wherein X is hydrogen, halogen or an alkyl group; R′ is hydrogen or an alkyl group; Y is halogen) which is obtainable by reacting a benzophenone hydrazone of general formula:

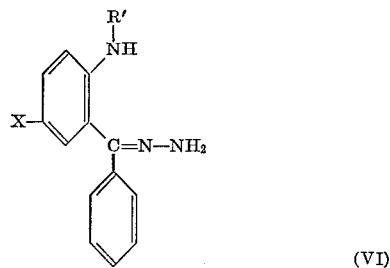
(VI)

(wherein X and R′ are as previously defined) with a halogenoacetyl halide of general formula:

Y—CO—CH$_2$—Y  (VII)

(wherein Y is halogen).

It is also possible to produce a 1,4,5-benzotriazocine derivative of general formula (III) by directly allowing the above benzophenone derivative (VIII) to undergo a ring closing reaction without isolating the same (VIII) from the reaction mixture.

The reaction of a compound of general formula (VI) with a compound of formula (VII) is preferably carried out in an organic solvent such as chloroform, methylene chloride, carbon tetrachloride or benzene. The reaction temperature is preferably as low as practicable.

The proportion of said compound (VII) should not be less than a stoichiometric amount relative to compound (VI) and, generally, it is preferable to employ (VII) in excess.

In addition, to ensure that the reaction will proceed smoothly and to increase the product yield, one may add a condensing agent such as a small amount of sodium hydroxide, sodium hydrogen carbonate or sodium carbonate. The compound of general formula (VIII) can be easily separated from the reaction mixture by a procedure which is conventional per se. For example, the reaction mixture is neutralized and, then, the organic layer is concentrated, followed by the addition of, for example, ether.

The cyclization of compound (VIII) taken place when the compound (VIII) is allowed to stand at room temperature or at a lower or elevated temperature. However, both heating and the presence of an alkali, such as sodium hydroxide, hasten the cyclization reaction. This cyclization reaction is preferably carried out in a solvent, exemplary solvents including benzene, chloroform, methylene chloride and carbon tetrachloride.

The cyclization product, i.e. the compound of general formula (III), can be easily separated from the reaction mixture by a procedure which is conventional per se. For example, the reaction mixture is concentrated under reduced pressure and, then, benzene or ether is added to the concentrate to crystallize the desired compound.

The process for the production of the compounds according to this invention will be further explained by way of the following examples.

EXAMPLE 1

In 10 ml. of chloroform is dissolved 4 g. (0.009523 mole) of 4-bromoacetyl-8-chloro-3,4-dihydro-1-methyl-6-phenyl-1,4,5-benzotriazocin-2(1H)-one, followed by the addition of a solution of 9.5 g. (0.1 mole) of 2-aminopyridine in 20 ml. chloroform. Under stirring, the mixture is allowed to react at 60° C. for 30–40 minutes, after which time the solvent is distilled off under reduced pressure. To the residue is added a 1N-hydrochloric acid until the pH is 4.

Then, the mixture is extracted with chloroform and the extract is washed three times with water, dried over sodium sulfate and concentrated under reduced pressure. The concentrate is column-chromatographed [on silica gel; solvent system; benzene-chloroform-ether (1:1:1)].

The eluate is concentrated under reduced pressure and ether is added to the oily concentrate, whereupon 8-chloro-3,4-dihydro-1-methyl - 6 - phenyl-1,4,5-benzotriazocin-2(1H)-one is obtained as white crystals melting at 145° C. Elementary analysis: Calcd. for $C_{16}H_{14}ClN_3O$ (percent): C, 64.11; H, 4.71; N, 14.02. Found (percent): C, 63.86; H, 4.46; N, 13.80.

EXAMPLE 2

By a procedure similar to that described in Example 1, 5 g. (0.01294 mole) of 4-bromoacetyl-3,4-dihydro-1-methyl-6-phenyl-1,4,5-benzotriazocin-2(1H) - one is reacted with 13 g. (0.138 mole) of 2-aminopyridine to obtain white crystals of 3,4 - dihydro-1-methyl-6-phenyl-1,4,5-benzotriazocin-2(1H)-one. Recrystallization from chloroform-n-hexane gives crystals melting at 110° C. Elementary analysis: Calcd. for $C_{16}H_{15}N_3O$ (percent): C, 72.43; H, 5.70; N, 15.84. Found (percent): C, 72.20; H, 5.85; N, 15.55.

EXAMPLE 3

To 5 g. (0.0123 mole) of 4-bromoacetyl-8-chloro-3,4-dihydro-6-phenyl-1,4,5-benzotriazocin-2(1H)-one is added 20 ml. of chloroform, followed by the addition of a solution of 15 g. (0.16 mole) of 2-aminopyridine in 30 ml. chloroform. Under stirring, the mixture is allowed to react at 60° C. for 30 minutes, after which time the solvent is removed by concentration under reduced pressure. To the residue is added 1N-hydrochloric acid until the pH is 4.

The mixture is then extracted with chloroform and the extract is washed three times with water, dried over sodium sulfate and concentrated under reduced pressure. The residue is column-chromatographed (solvent system: benzene-chloroform-ether=1:1:1).

The eluate is concentrated under reduced pressure and ether is added to the oily residue, whereupon 8-chloro-3,4-dihydro-6-phenyl-1,4,5-benzotriazocin-2(1H)-one is obtained as white crystals. Recrystallization from chloroform-ether-n-hexane gives crystals melting at 192°–194° C. Elementary analysis: Calcd. for $C_{15}H_{12}ClN_3O$ (percent): C, 63.05; H, 4.23; N, 14.71. Found (percent): C, 63.17; H, 4.07; N, 14.74.

EXAMPLE 4

Five grams (0.0134 mole) of 4-bromoacetyl-3,4-dihydro-6-phenyl-1,4,5-benzotriazocin-2(1H)-one and 15 g. (0.16 mole) of 2-aminopyridine are reacted and treated in the manner of Example 3, to obtain 3,4-dihydro-6-phenyl-1,4,5-benzotriazocin-2(1H)-one.

This product is recrystallized from chloroform-ether-n-hexane, which gives white crystals melting at 159°–160° C. Elementary analysis: Calcd. for $C_{15}H_{13}N_3O$ (percent): C, 71.70; H, 5.21; N, 16.72. Found (percent): C, 71.43; H, 5.11; N, 16.65.

The same product can be obtained by using thiourea in place of 2-aminopyridine and ethanol in place of chloroform in the above procedure.

EXAMPLE 5

In 20 ml. of chloroform is dissolved 1 g. (0.00238 mole of 4-bromoacetyl-8-chloro - 3,4 - dihydro-1-methyl-6-phenyl-1,4,5-benzotriazocin-2(1H)-one and, under stirring, the solution is added to a solution of 1 g. (0.0147 mole) of sodium ethoxide in 500 ml. of ethanol. The mixture is stirred at room temperature for 40 minutes, after which time a small amount of chloroform is added. The mixture is washed with water, dried over sodium sulfate and concentrated at low temperature and under reduced pressure. The residue is column-chromatographed (solvent system: benzene-ether-chloroform=1:1:1). The eluate is collected and concentrated under reduced pressure and ether is added to the concentrate, whereupon 8-chloro-3,4-dihydro - 1 - methyl-6-phenyl-1,4,5-benzotriazocin-2(1H)-one is obtained as white crystals melting at 145° C.

EXAMPLE 6

In 50 ml. of chloroform is dissolved 5 g. (0.0108 mole) of 4 - bromoacetyl - 8 - bromo-3,4-dihydro-1-methyl-6-phenyl-1,4,5-benzotriazocin-2(1H)-one, followed by the addition of a solution of 20 g. (0.212 mole) of 2-aminopyridine in 200 ml. chloroform. Under stirring, the mixture is allowed to react at 30°–40° C. for 30 minutes, after which time the solvent is distilled off under reduced pressure. To the residue is added 1N-hyrochloric acid until the pH is 4. The mixture is then extracted with chloroform and the extract is washed three times with water, dried over sodium sulfate and concentrated under reduced pressure. To the concentrate is added ether, whereupon 8-bromo-3,4-dihydro - 1-methyl-6-phenyl-1,4,5-benzotriazocin-2(1H)-one is obtained as white crystals. Recrystallization from ethanol gives crystals melting at 143°–145° C. Elementary analysis: Calcd. for $C_{16}H_{14}BrN_3O$ (percent): C, 55.83; H, 4.10; N, 12.21. Found (percent): C, 55.64; H, 4.00; N, 11.89.

EXAMPLE 7

To a mixture of 20 g. (0.0443 mole) of 4-bromoacetyl-8-bromo - 3,4 - dihydro-6-phenyl-1,4,5-benzotriazocin-2-(1H)-one and 100 ml. of chloroform is added a solution of 94.1 g. (1.0 mole) of 2-aminopyridine in 950 ml. chloroform and, under stirring, the mixture is allowed to react at 60° C. for 30–40 minutes.

The reaction mixture is treated in the manner of Example 6 to obtain white crystals of 8-bromo-3,4-dihydro-6 - phenyl-1,4,5-benzotriazocin-2(1H)-one. Recrystallization from chloroform-ether-n-hexane gives crystals decomposing at 208°–209° C. Elementary analysis: Calcd. for $C_{15}H_{12}BrN_3O$ (percent): C, 54.56; H, 3.66; N, 12.73. Found (percent): C, 54.63; H, 3.60; N, 12.66.

EXAMPLE 8

To 10 ml. of chloroform is added 1 g. (0.00256 mole) of 4 - bromoacetyl - 8 - fluoro-3,4-dihydro-6-phenyl-1,4,5-benzotriazocin-2(1H)-one and the resulting solution is added to a solution of 2.4 g. (0.0256 mole) of 2-aminopyridine in 15 ml. chloroform. Under stirring, the mixture is allowed to react at 50° C. for 5 minutes, after which time the solvent is concentrated under reduced pressure. To the concentrate is added 1N-hydrochloric acid under cooling with ice until the pH is 4. The mixture is then extracted with chloroform and the extract is washed three times with water, dried over sodium sulfate and concentrated under reduced pressure. To the oily residue is added n-hexane, whereupon 8-fluoro-3,4-dihydro-6-phenyl-1,4,5-benzotriazocin - 2(1H) - one is obtained as white crystals melting at 145°–150° C.

The infrared absorption spectrum in KBr tablet of the product indicates characteristic peaks at 1670 cm.$^{-1}$, 3040 cm.$^{-1}$, 3180 cm.$^{-1}$ and 3400 cm.$^{-1}$, and its nuclear magnetic resonance spectrum (solvent: $CDCl_3$, reference: TMS) indicates characteristic signals at 3.5 and 4.1 p.p.m. (2H) and 8.8 p.p.m. (1H).

EXAMPLE 9

A mixture of 1 g. (0.00247 mole) of 4-bromoacetyl-8-fluoro-3,4-dihydro-1-methyl-6-phenyl-1,4,5-benzotriazocin-2-(1H)-one and 20 ml. of chloroform is added to a mixture of 5 g. (0.053 mole) of 2-aminopyridine and 50 ml. of chloroform. Under stirring, the mixture is allowed to react at 30°–40° C. for 10 minutes, after which time the solvent is concentrated under reduced pressure. Under cooling with ice, 1N-hydrochloric acid is added to the concentrate until the pH is 4. The mixture is extracted with chloroform and the extract is washed three times with water, dried over sodium sulfate and concentrated under reduced pressure. The resulting oily residue is column-chromatographed (solvent system: benzene-chloroform-ether=1:1:1).

The eluate is concentrated under reduced pressure and the oily concentrate is treated with a mixture of n-hexane and ether, whereupon 8-fluoro-3,4-dihydro-1-methyl-6-phenyl - 1,4,5 - benzotriazocin-2(1H)-one is obtained as white crystals melting at 80°–81° C. Elementary analysis: Calcd. for $C_{16}H_{14}FN_3O$ (percent): C, 67.83; H, 4.98; N, 10.96. Found (percent): C, 67.68; H, 5.18; N, 10.71.

EXAMPLE 10

In 20 ml. of chloroform is dissolved 1 g. (0.0021 mole) of 4 - bromoacetyl - 8 - bromo-3,4-dihydro-1-methyl-6-phenyl-1,4,5-benzotriazocin-2(1H)-one and, under stirring, the resulting solution is added to a solution of 0.9 g. (0.0132 mole) of sodium ethoxide in 500 ml. ethanol. The mixture is stirred at room temperature for 40 minutes, after which time a small amount of chloroform is added, followed by washing with 3 portions of water. It is then dried over sodium sulfate and concentrated at low temperature and under reduced pressure. The residue is column-chromatographed (solvent system: benzene-ether-chloroform=1:1:1). The eluate is collected and concentrated under reduced pressure and ether is added to the residue, whereupon 8-bromo-3,4-dihydro - 1 - methyl-6-phenyl - 1,4,5 - benzotriazocin-2(1H)-one is obtained as white crystals. Recrystallization from ethanol gives crystals melting at 143°–145° C.

EXAMPLE 11

To a suspension of 2.5 g. (0.00647 mole) 4-bromoacetyl - 3,4 - dihydro-8-methyl-6-phenyl-1,4,5-benzotriazocin-2(1H)-one in 60 ml. chloroform is added to a solution of 10 g. (0.106 mole) of 2-aminopyridine in 50 ml. chloroform. Under stirring, the mixture is allowed to react at 60° C. for 30–40 minutes, after which time the solvent is concentrated under reduced pressure. To the residue is added 1N-hydrochloric acid until the pH is 4. The mixture is extracted with chloroform and the extract is washed with water (3 times), dried over sodium sulfate and concentrated under reduced pressure. Ether is added to the concentrate, whereupon 3,4 - dihydro-8-methyl-6-phenyl-1,4,5-benzotriazocin-2(1H)-one is obtained as white crystals. Recrystallization from chloroform-ether-n-hexane gives crystals melting at 212°–213° C. Elementary analysis: Calcd. for $C_{16}H_{15}N_3O$ (percent): C, 72.43; H, 5.70; N, 15.84. Found (percent): C, 72.23; H, 5.41; N, 15.56.

EXAMPLE 12

One gram (0.0025 mole) of 4-bromoacetyl-3,4-dihydro-1,8 - dimethyl-6-phenyl-1,4,5-benzotriazocin-2(1H)-one and 4 g. (0.0425 mole) of 2-aminopyridine are reacted and treated in the manner of Example 11 to obtain 3,4-dihydro-1,8-dimethyl - 6 - phenyl-1,4,5-benzotriazocin-2-(1H)-one. Recrystallization from chloroform-ether-n-hexane gives white crystals melting at 191°–192° C. Elementary analysis: Calcd. for $C_{17}H_{17}N_3O$ (percent): C, 73.09; H, 6.13; N, 15.04. Found (percent): C, 72.96; H, 6.11; N, 14.88.

EXAMPLE 13

To 50 ml. of ethanol is added 1 g. (0.0026 mole) of 4 - bromoacetyl - 3,4 - dihydro - 8 - methyl - 6 - phenyl-1,4,5-benzotriazocin-2(1H)-one, followed by the addition of 0.2 g. (0.0026 mole) of thiourea. Under stirring, the mixture is allowed to react at 60° C. for 1 hour and, then, refluxed for 45 minutes. The solvent is distilled off under reduced pressure and 14 ml. of water is added to the residue. The mixture is refluxed for a few minutes and allowed to cool. After cooling the solution is extracted with chloroform and the extract is washed with water (3 times), dried over sodium sulfate and concentrated under reduced pressure. The residue is column-chromatographed (on silica gel; solvent system: benzene-chloroform-ether=1:1:1). The eluate is concentrated under reduced pressure and ether is added to the residue, whereupon white crystals are obtained. Recrystallization from chloroform-ether-n-hexane yields crystals of 3,4-dihydro - 8 - methyl-6-phenyl-1,4,5-benzotriazocin-2(1H)-one, m.p. 212°–213° C.

EXAMPLE 14

To 1 g. (0.00238 mole) of 4-bromoacetyl-8-chloro-3,4-dihydro 1 - - methyl - 6 - phenyl - 1,4,5-benzotriazocin-2(1H)-one is added 30 ml. of chloroform. Under cooling with ice, the above mixture is added to 10 ml. of an aqueous (40%) solution of methylamine. The mixture is stirred at room temperature for 30 minutes, after which time the solvent is distilled off under reduced pressure, followed by the addition of water. The solution is extracted with chloroform and the extract is washed three times with water, dried over sodium sulfate and concentrated under reduced pressure. Ether is added to the oily residue and the mixture is allowed to stand in the cold, whereupon white crystals of 8 - chloro - 3,4-dihydro-4-methylaminoacetyl-1-methyl-6 - phenyl - 1,4,5 - benzotriazocin-2(1H)-one are obtained. Recrystallization from chloroform-ether-n-hexane yields crystals melting at 160° C. Elementary analysis: Calcd. for $C_{19}H_{19}ClN_4O_2$ (percent): C, 61.54; H, 5.16; N, 15.11. Found (percent): C, 61.29; H, 5.09; N, 15.20.

By procedures similar to the procedure described in Example 14, the following compounds can be obtained.

(1) 3,4 - Dihydro - 4 - methylaminoacetyl - 1 - methyl-6 - phenyl - 1,4,5 - benzotriazocin-2(1H)-one: This product is obtained as white crystals melting at 146°–148° C. and, after recrystallization from chloroform-ether-n-hexane, gives the following analysis. Calcd. for $$C_{19}H_{20}N_4O_2$$

(percent): C, 67.84; H, 5.99; N, 16.66. Found (percent): C, 67.55; H, 5.83; N, 16.40.

(2) 8 - Chloro - 3,4 - dihydro - 4 - methylaminoacetyl-6-phenyl - 1,4,5 - benzotriazocin - 2(1H) - one: This compound is obtained as white crystals melting at 191°–192° C. and, after recrystallization from chloroform-ether-n-hexane, gives the following analysis. Calcd. for $$C_{18}H_{17}ClN_4O_2$$

(percent): C, 60.59; H, 4.80; N, 15.70. Found (percent): C, 60.17; H, 4.61; N, 15.40.

(3) 3,4 - Dihydro - 4 - methylaminoacetyl - 6 - phenyl-1,4,5-benzotriazocin-2(1H)-one: This compound is obtained as white crystals melting at 164°–166° C. and, after recrystallization from chloroform-ether-n-hexane, gives the following analysis. Calc. for $C_{18}H_{18}N_4O_2$ (percent): C, 67.10; H, 5.63; N, 17.38. Found (percent): C, 66.87; H, 5.51; N, 17.00.

(4) 8 - Chloro - 3,4 - dihydro - 4-dimethylaminoacetyl-1 - methyl - 6 - phenyl - 1,4,5-benzotriazocin-2(1H)-one (white crystals, m.p. 126° C.). Elementary analysis: Calcd. for $C_{20}H_{21}ClN_4O_2$ (percent): C, 62.41; H, 5.50; N, 14.56. Found (percent): C, 62.23; H, 5.45; N, 14.79.

(5) 8 - Chloro - 3,4 - dihydro - 4 - dimethylaminoacetyl - 6 - phenyl - 1,4,5 - benzotriazocin - 2(1H) - one (white crystals, m.p. 178° C.). Elementary analysis: Calcd. for $C_{19}H_{19}ClN_4O_2$ (percent): C, 61.54; H, 5.16; N, 15.11. Found (percent): C, 61.35; H, 5.08; N, 14.90.

(6) 3,4 - Dihydro - 4 - methylaminoacetyl - 8 - methyl-6 - phenyl - 1,4,5 - benzotriazocin - 2(1H) - one (white crystals, m.p. 198°–199° C. after recrystallization from chloroform-ether-n-hexane). Elementary analysis: Calcd. for $C_{19}H_{20}N_4O_2$ (percent): C, 67.84; H, 5.99; N, 16.66. Found (percent): C, 67.64; H, 5.90; N, 16.44.

(7) 8 - Bromo - 3,4 - dihydro - 4 - methylaminoacetyl-6 - phenyl - 1,4,5 - benzotriazocin - 2(1H) - one (m.p. 196° C.). Elementary analysis: Calcd. for $C_{18}H_{17}BrN_4O_2$ (percent): C, 53.88; H, 4.27; N, 13.96. Found (percent): C, 53.69; H, 4.15; N, 13.60.

(8) 8 - Bromo - 3,4 - dihydro - 4 - methylaminoacetyl-1 - methyl - 6 - phenyl - 1,4,5 - benzotriazocin - 2(1H)-one (m.p. 167° C.). Elementary analysis: Calcd. for $C_{19}H_{19}BrN_4O_2$ (percent): C, 54.95; H, 4.61; N, 13.49. Found (percent): C, 54.88; H, 4.75; N, 13.55.

(9) 8 - Bromo - 3,4 - dihydro - 4 - dimethylaminoacetyl - 1 - methyl - 6 - phenyl - 1,4,5 - benzotriazocin-2(1H)-one (m.p. 143° C.). Elementary analysis: Calcd. for $C_{20}H_{21}BrN_4O_2$ (percent): C, 55.95; H, 4.93; N, 13.05. Found (percent): C, 55.70; H, 4.52; N, 12.80.

EXAMPLE 15

To 1 g. (0.00238 mole) of 4 - bromoacetyl - 8 - chloro-3,4 - dihydro - 1 - methyl - 6 - phenyl - 1,4,5 - benzotriazocin-2(1H)-one is added to 30 ml. of chloroform and, under cooling with ice, the mixture is added to 10 ml. of diethylamine solution. It is then stirred at room temperature for 30–40 minutes, after which time the solvent is distilled off under reduced pressure. Water is added to the residue, which is then extracted with chloroform. The extract is washed three times with water, dried over sodium sulfate and concentrated under reduced pressure.

To the oily residue is added a mixture of 6 ml. acetone and 0.5 ml. water, followed by the addition of 1 g. of tartaric acid. After the tartaric acid has dissolvetd, the mixture is filtered with a glass filter. The acetone solution is distilled to ½ the original volume and, then, allowed to stand in the cold, whereupon 8-chloro-3,4-dihydro - 4 - diethylaminoacetyl - 1 - methyl - 6 - phenyl-1,4,5 - benzotriazocin - 2(1H) - one tartarate separates as white needles. Recrystallization from acetone and water (5:1) gives white crystals melting at 113°–115° C. Similarly, the corresponding picrate is obtained: mp. 175° C. Elementary analysis: Calcd. for $$C_{22}H_{25}ClN_4O_2 \cdot C_6H_3N_3O_7$$

(picrate) (percent): C, 52.38; H, 4.40; N, 15.27. Found (percent): C, 52.23; H, 4.36; N, 14.98.

By procedures similar to the procedure described in Example 15, the following compounds are obtained.

(10) 8 - Chloro - 3,4 - dihydro - 4 - ethylaminoacetyl-1 - methyl - 6 - phenyl - 1,4,5 - benzotriazocin - 2(1H)-one tartarate dihydrate (m.p. 112°–114° C.). The corresponding picrate (m.p. 199° C.). Elementary analysis: Calcd. for $C_{20}H_{21}ClN_4O_2 \cdot C_6H_3N_3O_7$ (picrate) (percent): C, 50.86; H, 3.94; N, 15.97. Found (percent): C, 51.14; H, 3.87; N, 16.34.

(11) 4 - Diethylaminoacetyl - 3,4 - dihydro - 6 - phenyl-1,4,5 - benzotriazocin - 2(1H) - one (m.p. 174°–176° C. after recrystallization from acetone-hexane). Elementary analysis: Calcd. for $C_{21}H_{24}N_4O_2$ (percent): C, 69.21; H, 6.64; N, 15.37. Found (percent): C, 69.07; H, 6.62; N, 15.01.

EXAMPLE 16

In 50 ml. of benzene is dissolved 1 g. (0.00247 mole) of 4 - bromoacetyl - 3,4 - dihydro - 8 - fluoro - 1 - methyl-6 - phenyl - 1,4,5 - benzotriazocin - 2(1H) - one and, under stirring, the solution is added in droplets to 10 g. of a 70% aqueous solution of monoethylamine. The mixture is stirred at room temperature for 30 minutes, after which time it is concentrated under reduced pressure.

To the residue are added water and benzene, and the benzene layer is separated, washed with water (3 times), dried over sodium sulfate and concentrated under reduced pressure. The residue is allowed to crystallize from ether-n-hexane. The above procedure yields white crystals of 3,4 - dihydro - 4 - ethylaminoacetyl - 8 - fluoro - 1-methyl - 6 - phenyl - 1,4,5 - benzotriazocin - 2(1H) - one. Recrystallization from ethanol gives crystals melting at 135°–136° C. Elementary analysis: Calcd. for $C_{20}H_{21}N_4FO_2$ (percent): C, 65.20; H, 5.75; N, 15.21. Found (percent): C, 65.33; H, 5.83; N, 15.13.

EXAMPLE 17

To 30 ml. of chloroform is added 1 g. (0.00238 mole) of 4 - bromoacetyl - 8 - chloro - 3,4 - dihydro - 1 - methyl-6 - phenyl - 1,4,5 - benzotriazocin - 2(1H) - one and, under cooling with ice, 10 ml. of diallylamine is added to the mixture. After stirring at room temperature for 30–40 minutes, the solvent is distilled off under reduced pressure. To the residue is added water and the mixture is extracted with chloroform. The extract is washed three times with water, dried over sodium sulfate and concentrated under reduced pressure. To the concentrate is added a mixture of 6 ml. acetone and 0.5 ml. water, followed by the addition of 1 g. tartaric acid. After the tartaric acid has dissolved, the mixture is filtered with a glass filter. The acetone solution is distilled to ½ the original volume and allowed to stand in the cold, whereupon 8-chloro - 3,4 - dihydro - 4 - diallylaminoacetyl - 1 - methyl-6 - phenyl - 1,4,5 - benzotriazocin - 2(1H) - one tartarate separates out as white needles. Recrystallization from a mixture of acetone (5 parts) and water (1 part) gives white crystals melting at 86° C. Elementary analysis: Calcd. for $C_{24}H_{25}ClN_4O_2 \cdot C_4H_6O_6 \cdot 2H_2O$ (percent): C, 53.98; H, 5.66; N, 8.99. Found (percent): C, 54.06; H, 5.34; N, 8.91.

EXAMPLE 18

To 5 g. (0.01188 mole) of 4 - bromoacetyl - 8 - chloro-3,4 - dihydro - 1 - methyl - 6 - phenyl - 1,4,5 - benzotriazocin - 2(1H) - one is added 50 ml. of chloroform and the solution is added to 25 g. (0.268 mole) of aniline. Under stirring, the mixture is allowed to react at room temperature for 12 hours, after which time the solvent is distilled off under reduced pressure. To the residue is added 0.5 N-hydrochloric acid until the pH is about 3. The mixture is extracted with chloroform and the extract is washed three times with water, dried over sodium sulfate and concentrated under reduced pressure. Finally, ether is added to the concentrate, whereupon 8-chloro-3,4-dihydro - 1 - methyl - 4 - phenylaminoacetyl - 6 - phenyl-1,4,5 - benzotriazocin - 2(1H) - one is obtained as white crystals. Recrystallization from chloroform - n - hexane gives crystals melting at 182° C. Elementary analysis: Calcd. for $C_{24}H_{21}ClN_4O_2$ (percent): C, 66,58; H, 4.89; N, 11.94. Found (percent): C, 66.42; H, 4.86; N, 12.66.

By procedures similar to the procedure described in Example 18, the following compounds can be obtained.

(12) 8 - Chloro - 3,4 - dihydro - 4 - phenylaminoacetyl-6 - phenyl - 1,4,5 - benzotriazocin - 2(1H) - one (white crystals, m.p. 130° C.). Elementary analysis: Calcd. for $C_{23}H_{19}ClN_4O_2$ (percent): C, 65.95; H, 4.57; N, 13.38. Found (percent): C, 66.02; H, 4.39; N, 13.13.

(13) 8 - Chloro - 3,4 - dihydro - 4 - (p - methoxyphenyl)aminoacetyl - 1 - methyl - 6 - phenyl - 1,4,5-benzotriazocin-2(1H)-one (m.p. 191° C.). Elementary analysis: Calcd. for $C_{25}H_{23}ClN_4O_3$ (percent): C, 64.86; H, 5.01; N, 11.10. Found (percent): C, 64.57; H, 4.90; N, 12.08.

(14) 8 - Chloro - 3,4 - dihydro - 4 - (p - methoxyphenyl)aminoacetyl - 6 - phenyl - 1,4,5 - benzotriazocin-2(1H)-one (m.p. 197° C.). Elementary analysis: Calcd. for $C_{24}H_{21}ClN_4O_3$ (percent): C, 64.21; H, 4.72; N, 12.48. Found (percent): C, 63.92; H, 4.76; N, 12.53.

(15) 8 - Chloro - 3,4 - dihydro - 4 - (p - methylphenyl)aminoacetyl - 1 - methyl - 6 - phenyl - 1,4,5 - benzotriazocin-2(1H)-one (m.p. 188° C.). Elementary analysis: Calcd. for $C_{25}H_{23}ClN_4O_2$ (percent): C, 67.18; H, 5.19; N, 12.54. Found (percent): C, 66.86; H, 5.06; N, 12.12.

(16) 8 - Chloro - 3,4 - dihydro - 4 - (p - methylphenyl)aminoacetyl - 6 - phenyl - 1,4,5 - benzotriazocin - 2(1H)-one (m.p. 226° C.). Elementary analysis: Calcd. for $C_{24}H_{21}ClN_4O_2$ (percent): C, 66.58; H, 4.89; N, 12.94. Found (percent): C, 66.50; H, 5.10; N, 12.70.

EXAMPLE 19

To 5 g. (0.0134 mole) of 4 - bromoacetyl - 3,4 - dihydro - 6 - phenyl - 1,4,5 - benzotriazocin - 2(1H) - one is added 50 ml. of chloroform and, under stirring, the mixture is added to 25 g. (0.206 mole) of 2,6 - xylidine. The mixture is allowed to react at 60° C. for 2 hours, after which time the solvent is distilled off under reduced pressure. To the residue is added 0.5 N-hydrochloric acid until the pH is about 3. The mixture is extracted with chloroform and the extract is washed three times with water, dried over sodium sulfate and concentrated under reduced pressure. The concentrate is column-chromatographed (solvent system: benzene - ether - chloroform=1:1:1). The eluate is collected and concentrated. Finally, ether is added to the residue, whereupon 4-(2',6'-dimethylphenylamino)acetyl - 3,4 - dihydro - 6 - phenyl-1,4,5 - benzotriazocin - 2(1H) - one is obtained as white crystals. Recrystallization from chloroform-ether-n-hexane gives crystals melting at 215°–226° C. Elementary analysis: Calcd. for $C_{25}H_{24}N_4O_2$ (percent): C, 72.79; H, 5.86; N, 13.58. Found (percent): C, 72.50; H, 5.75; N, 13.34.

By a procedure similar to that described in Example 19, the following compounds can be obtained.

(17) 4 - (2',6' - Dimethylphenylamino)acetyl - 3,4-dihydro - 1 - methyl - 6 - phenyl - 1,4,5 - benzotriazocin-2(1H)-one (white crystals, m.p. 161°–162° C. after recrystallization from chloroform-ether-n-hexane). Elementary analysis: Calcd. for $C_{26}H_{26}N_4O_2$ (percent): C, 73.22; H, 6.14; N, 13.14. Found (percent): C, 73.00; H, 6.09; N, 12.96.

(18) 8 - Chloro-4-(2′,6′-dimethylphenylamino)acetyl-3,4-dihydro-1-methyl - 6 - phenyl - 1,4,5 - benzotriazocin-2(1H)-one (m.p. 170° C.). Elementary analysis: Calcd. for $C_{26}H_{25}ClN_4O_2$ (percent): C, 67.74; H, 5.47; N, 12.16. Found (percent): C, 67.58; H, 5.50; N, 12.00.

(19) 8-Chloro - 4 - (2′,5′-dimethylphenylamino)acetyl-3,4-dihydro-1-methyl - 6 - phenyl - 1,4,5 - benzotriazocin-2(1H)-one (m.p. 210° C.). Elementary analysis: $C_{26}H_{25}ClN_4O_2$ (percent): C, 67.74; H, 5.47; N, 12.16. Found (percent): C, 68.03; H, 5.42; N, 12.12.

(20) 8 - Chloro-4-(2′,6′ - diethylphenylamino)acetyl-3,4-dihydro-1-methyl - 6 - phenyl - 1,4,5 - benzotriazocin-2-(1H)-one (m.p. 125° C.). Elementary analysis: Calcd. for $C_{28}H_{29}ClN_4O_2$ (percent): C, 68.77; H, 5.98; N, 11.46. Found (percent): C, 68.99; H, 6.02; N, 11.00.

(21) 8 - Chloro-3,4-dihydro-4-(2′,5′ - dimethylphenylamino)acetyl-6-phenyl - 1,4,5 - benzotriazocin-2(1H)-one (m.p. 231° C.). Elementary analysis: Calcd. for $C_{25}H_{23}ClN_4O_2$ (percent): C, 67.18; H, 5.19; N, 12.54. Found (percent): C, 66.83; H, 5.25; N, 12.59.

(22) 8 - Chloro-3,4-dihydro-4-(2′,6′ - dimethylphenylamino)-acetyl - 6 - phenyl - 1,4,5 - benzotriazocin-2(-H)-one (m.p. 138° C.). Elementary analysis: Calcd. for $C_{25}H_{23}ClN_4O_2$ (percent): C, 67.18; H, 5.19 N, 12.54. Found (percent): C, 67.23; H, 5.12; N, 12.49.

(23) 8 - Chloro-3,4-dihydro-4-(2′,6′-dimethylamino)-acetyl-6-phenyl - 1,4,5 - benzotriazocin-2(1H)-one (m.p. 186° C.). Elementary analysis: Calcd. for $C_{27}H_{27}ClN_4O_2$ (percent): C, 68.27; H, 5.73; N, 11.80. Found (percent): C, 68.36; H, 5.71; N, 11.61.

(24) 3,4-Dihydro - 4 - (2′,5′ - dimethylphenylamino) acetyl-6-phenyl - 1,4,5 - benzotriazocin-2(1H)-one (m.p. 253° C.). Elementary analysis: Calcd. for $C_{25}H_{24}N_4O_2$ (percent): C, 72.79; H, 5.86; N, 13.58. Found (percent): C, 73.00; H, 5.86; N, 13.63.

(25) 3,4-Dihydro - 4 - (2,6′ - diethylphenylamino)acetyl-6-phenyl-1,4,5-benzotriazocin-2(1H)-one (m.p. 201° C.). Elementary analysis: Calcd. for $C_{27}H_{20}N_4O_2$ (percent): C, 73.61; H, 6.41; N, 12.72. Found (percent): C, 73.31; H, 6.34; N, 12.49.

(26) 8-Bromo - 3,4 - dihydro-4-(2′,6′-dimethylphenylamino)acetyl - 6 - phenyl - 1,4,5 - benzotriazocin-2(1H)-one (m.p. 144° C.). Elementary analysis: Calcd. for $C_{25}H_{23}BrN_4O_2$ (percent): C, 61.11; H, 4.72; N, 11.40. Found (percent): C, 61.05; H, 4.69; N, 11.48.

(27) 8-Bromo - 3,4 - dihydro-4-(2′,6′-dimethylphenylamino)acetyl-1-methyl-6-phenyl - 1,4,5 - benzotriazocin-2(1H)-one (m.p. 162° C.). Elementary analysis: Calcd. for $C_{26}H_{25}BrN_4O_2$ (percent): C, 61.79; H, 4.99; N, 11.09. Found (percent): C, 62.02; H, 4.94; N, 10.91.

(28) 3,4-Dihydro - 4 - (2′,6′ - dimethylphenylamino) acetyl-1,8-dimethyl - 6 - phenyl - 1,4,5 - benzotriazocin-2(1H)-one (white crystals, m.p. 170.5–171.5° C. after recrystallization from chloroform-ether-n-hexane). Elementary analysis: Calcd. for $C_{27}H_{28}N_4O_2$ (percent): C, 73.61; H, 6.41; N, 12.72. Found (percent): C, 73.34; H, 6.35; N, 12.57.

EXAMPLE 20

To 5 g. (0.01188 mole) of 4-bromoacetyl-8-chloro-3,4-dihydro-1-methyl-6-phenyl - 1,4,5 - benzotriazocin-2(1H)-one is added 50 ml. of chloroform and the mixture is added to 25 g. (0.196 mole) of o-chloroaniline. Under stirring, the mixture is allowed to react at room temperature for 12 hours, after which time the solvent is distilled off under reduced pressure. To the residue is added 0.5 N-hydrochloric acid until the pH is about 3. Then, chloroform is further added and the mixture is washed three times with water, dried over sodium sulfate and concentrated under reduced pressure. The concentrate is column-chromatographed (solvent system: benzene-ether-chloroform=1:1:1). The eluate is collected and concentrated. Then, ether is added to the residue, whereupon 4-(2′ - chlorophenylamino)acetyl-8-chloro-3,4-dihydro-1-methyl-6-phenyl - 1,4,5 - benzotriazocin-2(1H)-one is obtained as white crystals. Recrystallization from chloroform-ether-n-hexane gives crystals melting at 174°–175° C. Elementary analysis: Calcd. for $C_{24}H_{20}ClN_4O_2$ (percent): C, 61.68; H, 4.31; N, 11.99. Found (percent): C, 61.42; H, 4.22; N, 11.87.

By a procedure similar to that described in Example 20, the following compounds can be obtained.

(29) 8 - Chloro-3,4-dihydro-4-(2′-chlorophenylamino) acetyl - 6 phenyl - 1,4,5 - benzotriazocin - 2(1H) - one (m.p. 215°–215° C.). Elementary analysis: Calcd. for $C_{23}H_{18}Cl_2N_4O_2$ (percent): C, 60.94; H, 4.00; N, 12.36. Found (percent): C, 61.17; H, 4.04; N, 12.53.

(30) 8 - Chloro-3,4-dihydro-4-(2′-chlorophenylamino) acetyl-1-methyl-6-phenyl - 1,4,5 - benzotriazocin-2(1H)-one (m.p. 113° C.). Elementary analysis: Calcd. for $C_{24}H_{20}ClH_4O_2$ (percent): C, 61.68; H, 4.31; N, 11.99. Found (percent): C, 61.99; H, 4.53; N, 11.67.

(31) 8 - Chloro-3,4-dihydro-4-(3′-chlorophenylamino) acetyl-6-phenyl - 1,4,5 - benzotriazocin-2(1H)-one (m.p. 193° C.). Elementary analysis: Calcd. for $C_{23}H_{18}Cl_2N_4O_2$ (percent): C, 60.94; H, 4.00; N, 12.36. Found (percent): C, 61.02; H, 4.25; N, 12.49.

(32) 3,4-Dihydro - 4 - (3′-chlorophenylamino)acetyl-1-methyl-6-phenyl - 1,4,5-benzotriazocin-2(1H)-one( m.p. 152° C.). Elementary analysis: Calcd. for $C_{24}H_{21}ClN_4O_2$ (percent): C, 66.58; H, 4.89; N, 12.94. Found (percent): C, 66.43; H, 4.82; N, 12.94.

(33) 3,4-Dihydro - 4 - (2′-chlorophenylamino)acetyl-8 - methyl-6-phenyl-1,4,5-benzotriazocin-2(1H)-one (m.p. 202° C.). Elementary analysis: Calcd. for $C_{24}H_{21}ClN_4O_2$ (percent): C, 66.58; H, 4.89; N, 12.94. Found (percent): C, 66.78; H, 4.81; N, 12.83.

(34) 3,4-Dihydro - 4 - (2′-chlorophenylamino)acetyl-1,8-dimethyl - 6 - phenyl - 1,4,5 - benzotriazocin-2(1H)-one (m.p. 181° C.). Elementary analysis: Calcd. for $C_{25}H_{23}ClN_4O_2$ (percent): C, 67.18; H, 5.19; N, 12.54. Found (percent): C, 67.01; H, 5.09; N, 12.11.

(35) 8 - Bromo-3,4-dihydro-4-(3′-chlorophenylamino)-acetyl-6-phenyl - 1,4,5 - benzotriazocin-2(1H)-one (white crystals, m.p. 192°–193° C. after recrystallization from chloroform-ether-n-hexane). Elementary analysis: Calcd. for $C_{23}H_{18}BrClN_4O_2$ (percent): C, 55.49; H, 3.64; N, 11.26. Found (percent): C, 55.29; H, 3.52; N, 11.03.

(36) 8 - Bromo-3,4-dihydro-4-(3′-chlorophenylamino)-acetyl-1-methyl-6-phenyl - 1,4,5 - benzotriazocin-2(1H)-one (m.p. 127° C.). Elementary analysis: Calcd. for $C_{24}H_{20}BrClN_4O_2$ (percent): C, 56.32; H, 3.94; N, 10.95. Found (percent): C, 56.00; H, 3.92; N, 10.51.

(37) 3,4-Dihydro-4-(3′-chlorophenylamino)acetyl-1,8-dimethyl-6-phenyl-1,4,5-benzotriazocin-2(1H) - one (m.p. 145°–146° C.). Elementary analysis: $C_{25}H_{23}ClN_4O_2$ (percent): C, 67.18; H, 5.19; N, 12.54. Found (percent): C, 66.88; H, 5.12; N, 12.14.

EXAMPLE 21

To 5 g. (0.01188 mole) of 4-bromoacetyl-8-chloro-3,4-dihydro-1-methyl-6-phenyl-1,4,5-benzotriazocin - 2(1H)-one is added 50 ml. of chloroform, followed by the addition of 25 g. (0.233 mole) of benzylamine. Under stirring, the mixture is allowed to react at room temperature for 12 hours, after which time the solvent is distilled off under reduced pressure. To the residue is added 0.5 N-hydrochloric acid until the pH is about 3. An additional amount of chloroform is added and the mixture is washed three times with water, dried over sodium sulfate and concentrated under reduced pressure. The residue is column-chromatographed (solvent system: benzene-ether-chloroform=1:1:1): The eluate is collected and concentrated, followed by the addition of ether. The procedure yields white crystals of 4 - (benzylamino)acetyl-8-chloro-3,4-dihydro - 1 - methyl-6-phenyl-1,4,5-benzotriazocin-2-(1H)-one, m.p. 137°–138° C. Elementary analysis: Calcd. for $C_{25}H_{23}ClN_4O_2$ (percent): C, 67.18; H, 5.19; N, 12.54. Found (percent): C, 67.12; H, 5.12; N, 12.16.

By a procedure similar to that described in Example 21, the following compounds can be obtained.

(38) 8-Chloro - 3,4 - dihydro-4-(1-phenylethylamino)acetyl - 1 - methyl-6-phenyl-1,4,5-benzotriazocin-2(1H)-one (m.p. 160° C.). Elementary analysis: Calcd. for $C_{26}H_{25}ClN_4O_2$ (percent): C, 67.74; H, 5.67; N, 12.16. Found (percent): C, 67.45; H, 5.40; N, 12.42.

(39) 8-Chloro - 3,4 - dihydro-4-(1-phenylethylamino)acetyl - 6 - phenyl-1,4,5-benzotriazocin-2(1H)-one (m.p. 146° C.). Elementary analysis: Calcd. for $C_{25}H_{23}ClN_4O_2$ (percent): C, 67.18; H, 5.19; N, 12.54. Found (percent): C, 66.97; H, 5.37; N, 12.14.

(40) 3,4 - Dihydro - 4-(benzylamino)acetyl-6-phenyl-1,4,5 - benzotriazocin - 2(1H)-one (white crystals) m.p. 198°–205° C. after crystallization from chloroform-n-hexane). Elementary analysis: Calcd. for $$C_{24}H_{22}N_4O_2 \cdot H_2O$$

(percent): C, 69.22; H, 5.81; N, 13.45. Found (percent): C, 69.67; H, 5.25; N, 13.32.

(41) 8 - Bromo - 3,4-dihydro-4-(benzylamino)acetyl-1-methyl - 6 - phenyl-1,4,5-benzotriazocin-2(1H)-one (m.p. 147° C.). Elementary analysis: Calcd. for $C_{25}H_{23}BrN_4O_2$ (percent): C, 61.11; H, 4.72; N, 11.40. Found (percent): C, 60.82; H, 4.69; N, 11.00.

(42) 3,4-Dihydro-4-(benzylamino)acetyl-1,8-dimethyl-6-phenyl-1,4,5-benzotriazocin-2(1H)-one (m.p. 142° C.). Elementary analysis: Calcd. for $C_{26}H_{26}N_4O_2$ (percent): C, 73.22; H, 6.14; N, 13.14. Found (percent): C, 73.00; H, 6.17; N, 12.89.

EXAMPLE 22

To 30 ml. of chloroform is added 1 g. (0.00238 mole) of 4 - bromoacetyl-8-chloro-3,4-dihydro-1-methyl-6-phenyl-1,4,5-benzotriazocin-2(1H) - one and, under cooling with ice, the above mixture is added to 10 ml. of an (40%) aqueous solution of piperidine. The mixture is stirred at room temperature for 30 minutes, after which time the solvent is distilled off under reduced pressure, followed by the addition of water. The mixture is extracted with chloroform and the extract is washed three times with water, dried over sodium sulfate and concentrated under reduced pressure. Ether is added to the resulting oily residue and the mixture is allowed to stand in the cold, whereupon 8-chloro-3,4-dihydro-4-piperidinoacetyl - 1 - methyl-6-phenyl-1,4,5-benzotriazocin-2(1H)-one is obtained as white crystals. Recrystallization from chloroform-ether-n-hexane gives crystals melting at 171° C. Elementary analysis: Calcd. for $C_{23}H_{25}ClN_4O_2$ (percent): C, 65.00; H, 5.93; N, 13.19. Found (percent): C, 64.73; H, 5.84; N, 12.93.

By a procedure similar to that described in Example 22, the following compounds can be obtained.

(43) 8-Chloro-3,4-dihydro-4-pyrrolidinoacetyl-1-methyl-6-phenyl-1,4,5-benzotriazocin-2(1H) - one (m.p. 154° C.). Elementary analysis: Calcd. for $C_{22}H_{23}ClN_4O_2$ (percent): C, 64.30; H, 5.64; N, 13.64. Found (percent): C, 64.53; H, 5.59; N, 13.56.

(44) 8-Chloro-3,4-dihydro-4-morpholinoacetyl-1-methyl-6-phenyl-1,4,5-benzotriazocin-2(1H) - one (m.p. 142° C.). Elementary analysis: Calcd. for $C_{22}H_{23}ClN_4O_3$ (percent): C, 61.89; H, 5.43; N, 13.12. Found (percent): C, 61.59; H, 5.34; N, 12.92.

(45) 8-Chloro-3,4-dihydro-4-morpholinoacetyl-6-phenyl-1,4,5-benzotriazocin-2(1H)-one (m.p. 117° C.). Elementary analysis: Calcd. for $C_{21}H_{21}ClN_4O_3$ (percent): C, 61.09; H, 5.13; N, 13.57. Found (percent): C, 60.80; H, 4.97; N, 13.22.

(46) 8-Chloro-3,4-dihydro-4-piperidinoacetyl-6-phenyl-1,4,5 - benzotriazocin-2(1H)-one (m.p. 129° C.). Elementary analysis: Calcd: for $C_{22}H_{23}ClN_4O_2$ (percent): C, 64.30; H, 5.64; N, 13.64. Found (percent): C, 64.40; H, 5.67; N, 13.48.

(47) 8 - Chloro-3,4-dihydro-4-pyrrolidinoacetyl-6-phenyl-1,4,5-benzotriazocin-2(1H)-one (m.p. 168° C.). Elementary analysis: Calcd. for $C_{21}H_{21}ClN_4O_2$ (percent): C, 63.55; H, 5.33; N, 14.12. Found (percent): C, 63.24; H, 5.19; N, 13.77.

(48) 3,4-Dihyro - 4 - pyrrolidinoacetyl-6-phenyl-1,4,5-benzotriazocin - 2(1H)-one (m.p. 103° C.). Elementary analysis: Calcd. for $C_{21}H_{21}N_4O_2$ (percent): C, 69.59; H, 6.12; N, 15.46. Found (percent): C, 69.68; H, 6.43; N, 15.10.

(49) 8-Bromo-3,4-dihydro-4-piperidinoacetyl-6-phenyl-1,4,5-benzotriazocin-2(1H)-one (m.p. 130° C.). Elementary analysis: Calcd. for $C_{22}H_{23}BrN_4O_2$ (percent): C, 58.03; H, 5.09; N, 12.30. Found (percent): C, 58.15; H, 5.01; N, 12.25.

(50) 8-Bromo-3,4-dihydro-4-piperidinoacetyl-1-methyl-6-phenyl-1,4,5-benzotriazocin-2(1H)-one (m.p. 133° C.). Elementary analysis: Calcd. for $C_{23}H_{25}BrN_4O_2$ (percent): C, 58.85; H, 5.37; N, 11.94. Found (percent): C, 58.50; H, 5.24; N, 11.50.

EXAMPLE 23

In 30 ml. of chloroform is dissolved in 1 g. (0.00238 mole) of 4-bromoacetyl-8-chloro-3,4-dihydro-1-methyl-6-phenyl-1,4,5-benzotriazocin-2(1H)-one and the resulting solution is added in droplets to a solution of 5 g. (0.058 mole) piperazine in 60 ml. chloroform. After the dropwise addition is completed, the mixture is stirred at room temperature for 30 minutes. After the addition of water, the reaction mixture is washed 5 times with water. The chloroform layer is separated, dried over sodium sulfate and concentrated under reduced presure.

To the residue is added ether-n-hexane, whereupon 8-chloro - 3,4 - dihydro - 1 - methyl - 4 - piperazinoacetyl-6-phenyl - 1,4,5 - benzotriazocin-2(1H)-one is obtained as white powder.

The infrared absorption spectrum in KBr tablet of the product indicates characteristic peaks at 1675 cm.$^1$ and 3400 cm.$^{-1}$, and its nuclear magnetic resonance spectrum (solvent: CDCl$_3$, reference: TMS) indicates characteristic signals at 1.9 p.p.m. (1H), 2.68 p.p.m. (4H), 2.87 p.p.m. (4H), 3.3 pp.m. (3H), 3.8 p.p.m. (2H), 4.06 p.p.m (1H), 5.23 p.p.m. (1H) and 7.1–7.6 p.p.m. (8H).

By a procedure similar to that described in Example 23, the following compounds can be obtained.

(51) 8-Bromo-3,4-dihydro-1-methyl-4-piperazinoacetyl-6-phenyl-1,4,5-benzotriazocin-2(1H)-one, m.p. 143°–145° C. Elementary analysis: Calcd. for $C_{22}H_{24}BrN_5O_2$ (percent): C, 56.18; H, 5.14; N, 14.89. Found (percent): C, 56.23; H, 5.22; N, 14.75.

(52) 8-Fluoro-3,4-dihydro-1-methyl-4-piperazinoacetyl-6-phenyl-1,4,5-benzotriazocin-2(1H)-one, m.p. 64°–66° C. The infrared absorption spectrum in KBr tablet of the product indicates characteristic peaks at 1670 cm.$^{-1}$, 1700 cm.$^{-1}$ and 3300 cm.$^{-1}$, and its nuclear magnetic resonance spectrum (solvent: CDCl$_3$, reference: TMS) indicates characteristic signals at 2.23 p.p.m. (1H), 2.71 p.p.m. (4H), 2.90 p.p.m. (4H), 3.33 p.p.m. (3H), 3.82 p.p.m. (2H), 4.08 p.p.m. (1H), 5.24 p.p.m. (1H) and 6.7–7.8 p.p.m. (8H).

EXAMPLE 24

In 200 ml. of chloroform is dissolved 5 g. (0.01188 mole) of 4-bromoacetyl-8-chloro-3,4-dihydro-1-methyl-6-phenyl-1,4,5-benzotriazocin-2(1H)-one and the resulting solution is added to a solution of 1.67 g. (0.0119 mole) hexamethylenetetramine in chloroform. The mixture is stirred at room temperature for 20–30 minutes, after which time ⅘ of the original volume of the solvent is distilled off under reduced pressure. Finally, ether is added to the residue, whereupon [8-chloro-3,4-dihydro-1-methyl-2 - oxo - 6 - phenyl - 1,4,5 - benzotriazocin - 4 - yl] carbonylmethylhexamethylene-tetraminium monobromide is obtained as white crystals which decompose at 180°–185° C. Elementary analysis: Calcd. for $$C_{24}H_{27}BrClN_7O_2$$

(percent): C, 51.39; H, 4.85; N, 17.48. Found (percent): C, 51.05; H, 4.99; N, 17.18.

EXAMPLE 25

A solution of 1 g. (0.00238 mole) 4-bromoacetyl-8-chloro-3,4-dihydro-1-methyl - 6 - phenyl-1,4,5-benzotriazocin-2(1H)-one in 15 ml. chloroform is added to 5 g. (0.0462 mole) of phenylhydrazine and, under stirring, the mixture is allowed to react at room temperature overnight. After the reaction is completed, the reaction mixture is concentrated under reduced pressure. To the concentrate is added 1N-hydrochloric acid until the pH is about 3, followed by the addition of 50–100 ml. of chloroform. The chloroform layer is washed with 3 to 5 portions of water, dried over sodium sulfate and concentrated under reduced pressure. The resulting syrup is column-chromatographed (solvent system: benzene-chloroform-ether: 1:1:1). The eluate is concentrated under reduced pressure, followed by the addition of ether-n-hexane. The procedure yields pale yellowish crystals of 8-chloro-3,4-dihydro-1-methyl - 4 - phenylhydrazinoacetyl - 6 - phenyl - 1,4,5 - benzotriazocin-2(1H)-one, which decompose at 100° C. Elementary analysis: Calcd. for $C_{24}H_{22}N_5ClO_2$ (percent): C, 64.35; H, 4.95; N, 15.64. Found (percent): C, 64.43; H, 5.16; N, 15.34.

EXAMPLE 26

(1) In 500 ml. of chloroform is dissolved 10 g. (0.04070 mole) of 2-amino-5-chlorobenzophenone hydrazone and, under cooling with ice and stirring, 300 ml. of a 0.5 N-aqueous solution of sodium hydroxide is added. Then, at 0°–5° C., 30 g. (0.1486 mole) of bromoacetyl bromide is added in small installments. After the dropwise addition is completed, the mixture is stirred for 30 minutes. At this moment, the solution is acidic. So, a 0.5 N-aqueous solution of sodium hydroxide is added until the mixture is neutral. Then, the chloroform layer is separated, washed three times with water, dried over sodium sulfate and concentrated under reduced pressure. Finally, ether is added to the concentrate, whereupon 18.8 g. of 2-bromoacetamido-5-chloro-benzophenone bromoacetyl - hydrazone is obtained as white crystals. Yield 94.8%. Recrystallization from chloroform-ether-n-hexane gives crystals melting at 161° C. Elementary analysis: Calcd. for

(percent): C, 41.88; H, 2.89; N, 8.62. Found (percent): C, 42.03; H, 2.80; N, 8.44.

(2) Ten grams (0.02051 mole) of the 2-bromoacetamido - 5 - chlorobenzophenone bromoacetylhydrazone obtained as above is dissolved in 1 liter of chloroform and the solution is cooled to 10°–15° C. Then, under stirring, a solution of 1.5 g. (0.0375 mole) sodium hydroxide in 200 ml. water is added. The mixture is maintained at 10°–15° C. for 1–1.5 hours and, then, the temperature is increased to 25°–33° C. At this temperature level the mixture is allowed to react for 5–6 hours.

After the reaction has been completed, the chloroform layer is separated, washed with 3 portions of water, dried over sodium sulfate and concentrated under reduced pressure. Finally, ether is added to the concentrate, whereupon 4-bromoacetyl-8-chloro - 3,4 - dihydro-6 - phenyl - 1,4,5 - benzotriazocin-2(1H)-one is obtained as white crystals. Recrystallization from chloroform-n-hexane gives crystals melting at 211°–212° C. Elementary analysis: Calcd. for $C_{17}H_{13}ClBrN_3O_2$ (percent): C, 50.21; H, 3.22; N, 10.33. Found (percent): C, 50.49; H, 3.30; N, 10.03.

EXAMPLE 27

(1) Twenty grams (0.09466 mole) of 2 - aminobenzophenone hydrazone and 100 g. (0.4953 mole) of bromoacetyl bromide are reacted and treated in the manner of Example 26 to obtain 30 g. (0.662 mole) of 2-bromoacetamidobenzophenone bromoacetylhydrazone. Yield 70%. Recrystallization from chloroform-ether-n-hexane gives white crystals melting at 151° C. Elementary analysis: Calcd. for $C_{17}H_{15}Br_2N_3O_2$ (percent): C, 45.06; H, 3.34; N, 9.27. Found (percent): C, 44.79; H, 3.10; N, 8.94.

(2) Ten grams (0.0221 mole) of the 2-bromoacetamido - benzophenone bromoacetylhydrazone obtained as above (1) and a solution of 1.5 g. (0.0375 mole) of sodium hydroxide in 200 ml. water are reacted and treated in the same manner as Example 26 to obtain 4 - bromoacetyl - 3,4 - dihydro - 6 - phenyl-1,4,5-benzotriazocin-2(1H)-one. Recrystallization from chloroform-ether-n-hexane gives white crystals melting at 190° C. Elementary analysis: Calcd. for $C_{17}H_{14}BrN_3O_2$ (percent): C, 54.85; H, 3.79; N, 11.29. Found (percent): C, 54.55; H, 3.58; N, 10.94.

EXAMPLE 28

In 100 ml. of benzene is dissolved 4 g. (0.0163 mole) of 2-methylamino-5-chlorobenzophenone hydrazone and, under stirring and cooling with ice, 75 ml. of a 1N-aqueous solution of sodium hydroxide is added.

Then, at 0°–5° C., 10 g. (0.0495 mole) of bromoacetyl bromide is added in small installments. After the dropwise addition is completed, the mixture is stirred for 30 minutes. At this moment, the reaction mixture is acidic. So, a 1N-aqueous solution of sodium hydroxide is added until the pH is about 8.

Without separating the reaction product, the temperature of the mixture is increased to 10°–15° C. followed by stirring for 30 minutes. Then, the benzene layer is separated through a separatory funnel, washed with 3 portions of water and dried over sodium sulfate and concentrated under reduced pressure. To the oily residue is added ether, whereupon 4 - bromoacetyl-8-chloro-3,4-dihydro-1-methyl-6-phenyl - 1,4,5 - benzotriazocin-2(1H)one is obtained. Recrystallization from chloroform-n-hexane gives white crystals melting at 200° C. Elementary analysis: Calcd. for $C_{18}H_{15}ClBrN_3O_2$ (percent): C, 51.39; H, 3.59; N, 9.99. Found (percent): C, 51.24; H, 3.66; N, 9.99.

EXAMPLE 29

Thirty-six grams of oily 2-methylaminobenzophenone hydrazone, which is obtainable by reacting 37 g. (0.175 mole) of 2-methylaminobenzophenone with 100% hydrazine hydrate, is not crystallized but dissolved in 500 ml. of benzene and the solution is cooled under stirring. Then, a solution of 25 g. (0.625 mole) of sodium hydroxide in 750 ml. water is added, followed by stirring under cooling with ice. At 5°–10° C., 100 g. (0.495 mole) of bromoacetyl bromide is added in droplets. The reaction product is not isolated. After the dropwise addition is completed, the mixture is stirred at 10°–15° C. for 1 hour. At this moment the reaction mixture is acidic. So, a 1N-aqueous solution of sodium hydroxide is added until the pH is about 8.

The benzene layer is separated, washed with 3 portions of water, dried over sodium sulfate and concentrated under reduced pressure. Finally, ether is added to the concentrate, whereupon 4-bromoacetyl-3,4-dihydro-1-methyl-6 - phenyl-1,4,5-benzotriazocin-2(1H)-one is obtained as white crystals. Recrystallization from chloroform-n-hexane gives white crystals melting at 160° C.

Alternatively, the desired separation and purification can easily be accomplished by subjecting the concentrate from the reaction mixture to column-chromatography on silica gel (solvent system: benzene-ether-chloroform= 1:1:1). Elementary analysis: Calcd. for $C_{18}H_{16}BrN_3O_2$ (percent): C, 55.97; H, 4.18; N, 10.88. Found (percent): C, 56.09; H, 4.00; N, 10.59.

EXAMPLE 30

(1) In 500 ml. of chloroform is dissolved 10 g. (0.0345 mole) of 2-amino-5-bromobenzophenone hydrazone and the solution is stirred under cooling with ice. Then, a solution of 8 g. (0.2 mole) of sodium hydroxide in 350 ml. water is added and the mixture is further stirred under cooling with ice. At 5°–10° C., 75 g. (0.37 mole) of bromoacetyl bromide is added in small installments. After the dropwise addition is completed, the reaction mixture is further stirred at 10°–15° C. for 1 hour, at the end of which time at 0.5 N aqueous solution of sodium hydroxide is added until the pH in about 8. The chloroform layer is separated, washed with water, dried and concentrated under reduced pressure. Finally, ether is added to the concentrate, whereupon 2-bromoacetamido-5-bromobenzophenone bromoacetylhydrazone is obtained as white crystals. Recrystallization from chloroform-ether-n-hexane gives crystals melting at 148°–149° C. Elementary analysis: Calcd. for $C_{17}H_{14}Br_3N_3O_2$ (percent): C, 38.38; H, 2.65; N, 7.90. Found (percent): C, 38.34; H, 2.42; N, 7.82.

(2) Ten grams (0.018 mole) of the 2-bromoacetamido-5-bromobenzophenone bromoacetylhydrazone obtained as above is adissolved in 300 ml. of chloroform, followed by the addition of 240 ml. acetone. Then, with stirring at room temperatuer, a solution of 0.7 g. (0.019 mole) sodium hydroxide in 38 ml. water is added dropwise. The mixture is stirred at 30° C. for 2 hours, at the end of which time water is added. The chloroform layer is separated, washed with water, dried over sodium sulfate and concentrated under reduced pressure.

A small amount of benzene is added to the concentrate and the mixture is allowed to stand at room temperature, whereon 4 - bromoacetyl-3,4-dihydro-8-bromo-6-phenyl-1,4,5-benzotriazocin-2(1H)-one is obtained as white crystals. Recrystallization from chloroform-ether-n-hexane gives crystals melting at 204°–206° C. Elementary analysis: Calcd. for $C_{17}H_{13}Br_2N_3O_2$ (percent): C, 45.26; H, 2.90; N, 9.31. Found (percent): C, 45.00; H, 2.73; N, 9.00.

EXAMPLE 31

(1) In 800 ml. of chloroform is dissolved 18 g. (0.0785 mole) of 2-amino-5-fluorobenzophenone hydrazone and with stirring and under cooling with ice, 300 ml. of a 1N-aqueous solution of sodium hydroxide is added. Then, at 5° C., 100 g. (0.4953 mole) of bromoacetyl bromide is added dropwise. After the dropwise addition is completed, the mixture is stirred for 30 minutes and, then, neutralized with a 1N-aqueous solution of sodium hydroxide. The chloroform layer is separated, washed with water, dried over sodium sulfate and concentrated under reduced pressure. Finally, ether is added to the residue, whereupon 2-bromoacetamido-5 - fluorobenzophenone bromoacetylhydrazone is obtained as white crystals. Recrystallization from chloroform-hexane gives crystals decomposing at 154°–156° C. Elementary analysis: Calcd. for $$C_{17}H_{14}Br_2FN_3O_2$$

(percent): C, 43.34; H, 3.00; N, 8.92. Found (percent): C, 43.06; H, 2.88; N, 8.78.

(2) Ten grams (0.0256 mole) of 2-bromoacetamido-5-fluorobenzophenone bromoacetylhydrazone is dissolved in a mixture of 200 ml. chloroform and 200 ml. acetone, followed by the addition of a mixture of 50 ml. of 0.5 N-aqueous sodium hydroxide and 50 ml. of acetone. The mixture is stirred. The organic layer is separated, washed with water, dried over sodium sulfate and concentrated under reduced pressure. Finally, ether is added to the concentrate, whereupon 4-bromoacetyl-6-phenyl-8-fluoro-3,4-dihydro - 1,4,5 - benzotriazocin-2(1H)-one is obtained as white crystals. Recrystallization from chloroformhexane gives crystals decomposing at 198° C. Elementary analysis: Calcd. for $C_{17}H_{13}BrFN_3O_2$ (percent): C, 52.32; H, 3.36; N, 10.77. Found (percent): C, 52.25; H, 3.23; N, 10.81.

EXAMPLE 32

(1) In 1 liter of cholorform is dissolved 25 g. (0.111 mole) of 2-amino-5-methylbenzophenone hydrazone and the solution is cooled under stirring. Then, a solution of 10 g. (0.25 mole) of sodium hydroxide in 250 ml. water is added and the mixture is further stirred under cooling with ice. At 5°–10° C., 75 g. (0.37 mole) of bromoacetyl bromide is added in small installments. After the dropwise addition is completed, the mixture is stirred at 10°–15° C. for 1 hour. The reaction mixture is adjusted to pH about 8 with a 0.5 N-aqueous solution of sodium hydroxide. The chloroform layer is separated, washed with water, dried over sodium sulfate and concentrated under reduced pressure. Finally, ether is added to the concentrate, whereupon 2-bromoacetamido-5-methylbenzophenone bromoacetylhydrazone is obtained as white crystals. Recrystallization from chloroform-ether-n-hexane gives crystals melting at 142°–143° C. Elementary analysis: Calcd. for $C_{18}H_{17}Br_2N_3O_2$ (percent): C, 46.28; H, 3.67; N, 8.99. Found (percent): C, 46.00; H, 3.48; N, 8.79.

(2) In 60 ml. of chloroform is dissolved 4.67 g. (0.01 mole) of the 2-bromoacetamido-5-methylbenzophenone bromoacetylhydrazone, followed by the addition of 100 ml. acetone. Then, a mixture of 100 ml. of acetone and an aqueous solution containing 0.4 g. (0.01 mole) sodium hydroxide in 20 ml. water is added dropwise at room temperature with stirring.

The stirring is continued at room temperature for 30 minutes, after which time the reaction mixture is extracted with chloroform. The extract is washed with 3 portions of water, dried over sodium sulfate and concentrated under reduced pressure. A small amount of benzene is added to the concentrate, which is then allowed to stand at room temperature, whereupon 4-bromoacetyl-3,4 - dihydro - 8-methyl-6-phenyl-1,4,5-benzotriazocin-2(1H)-one is obtained as white crystals. Recrystallization from choloroform-ether-n-hexane gives crystals melting at 211°–212° C. Elementary analysis: Calcd. for $C_{18}H_{16}BrN_3O_2$ (percent): C, 55.97; H, 4.18; N, 10.88. Found (percent): C, 55.72; H, 3.92; N, 10.66.

EXAMPLE 33

To a mixture of 50 g. (0.1723 mole) of 2-methylamino-5-bromobenzophenone and 200 ml. of ethanol is added 200 ml. of ethanol saturated with hydrogen chloride. Then, 500 g. of 100% hydrazine hydrate is added. With the addition of 800 ml. ethanol, the mixture is refluxed under stirring for 7–8 hours. After cooling to room temperature, the solution is extracted with chloroform and the extract is washed with water, dried over sodium sulfate and concentrated under reduced pressure. The above procedure yields an oil of 2-methylamino-5-bromobenzophenone hydrazone. This oil is dissolved in 1 liter of benzene and the solution is cooled under stirring. Then, a solution of 50 g. (0.472 mole) sodium carbonate in 1 liter water is added and the mixture is further stirred under cooling with ice. At 5°–10° C., 150 g. of bromoacetyl bromide is added in small installments. After the dropwise addition is completed, the mixture is stirred at 10°–15° C. for 1 hour. It is then adjusted to pH about 8 with 0.5N sodium hydroxide. The benzene layer is separated, washed with water, dried over sodium sulfate and concentrated under reduced pressure. Finally, ether and a small amount of benzene are added to the concentrate, whereupon 4 - bromoacetyl - 8-bromo-3,4-dihydro - 1 - methyl-6-phenyl-1,4,5-benzotriazocin-2(1H)-one is obtained as white crystals.

Recrystallization from chloroform-ether-n-hexane gives crystals melting at 195°–197° C. Elementary analysis: Calcd. for $C_{18}H_{15}Br_2N_3O_2$ (percent): C, 46.48; H, 3.25; N, 9.03. Found (percent): C, 46.33; H, 3.03; N, 8.71.

EXAMPLE 34

To 15 g. (0.0654 mole) of 2-methylamino-5-fluorobenzophenone is added 100 ml. of ethanol and, under stirring, 60 ml. of ethanol saturated with hydrogen chloride is further added. Under cooling 150 g. of 100% hydrazine hydrate and, then, 200 ml. of ethanol are added. The mixture is refluxed for 7 hours, with stirring. The reaction mixture is cooled to room temperature and extracted with chloroform. The extract is washed with 3 portions of water, dried over sodium sulfate and concentrated under reduced pressure. The procedure yields an oil (15 g.) of 2-methylamino-5-fluorobenzophenone hydrazone. This oil is dissolved in 300 ml. of benzene and a solution of 15 g. (0.1415 mole) sodium carbonate in 250 ml. water is added. The mixture is stirred under cooling. Then, while the temperature of the solution is maintained at 5°–10° C., 60 g. (0.297 mole) of bromoacetyl bromide is added in droplets. After the dropwise addition is completed, the mixture is stirred to 10°–15° C. for 30 minutes and, then adjusted to pH about 10 with 0.5 N-sodium hydroxide.

The benzene layer is separated and washed with 3–5 portions of water. The benzene solution is dried over sodium sulfate and concentrated under reduced pressure. Then, a small amount of benzene-ether is added to the concentrate, whereupon 4-bromoacetyl-8-fluoro-3,4-dihydro - 1 - methyl-6-phenyl-1,4,5-benzotriazocin-2(1H)-one is obtained as white crystals. Recrystallization from benzene-ether gives crystals melting at 143°–144° C. Elementary analysis: Calcd. for $C_{18}H_{15}BrFN_3O_2$ (percent): C, 53.48; H, 3.74; N, 10.40. Found (percent): C, 53.55; H, 3.55; N, 10.29.

EXAMPLE 35

To a mixture of 50 g. (0.222 mole) 2-methylamino-5-methylbenzophenone and 200 ml. ethanol is added 200 ml. of ethanol saturated with hydrogen chloride, followed by the addition of 500 g. 100% hydrazine hydrate. Then, 900 ml. of ethanol is further added and the mixture is refluxed under stirring for 7–8 hours. After the reaction has been completed, the reaction mixture is cooled to room temperature and chloroform is added. It is then washed with 3 portions of water. The chloroform layer is separated, dried over sodium sulfate and concentrated under reduced pressure. The procedure yields an oil of 2-methylamino-5-methylbenzophenone hydrazone. This oil is dissolved in 500 ml. of benzene and the solution is cooled under stirring. An aqueous solution containing 25 g. (0.625 mole) of sodium hydroxide in 1000 ml. of water is added and the mixture is stirred under cooling with ice. A 5°–10° C., 150 g. (0.743 mole) of bromoacetyl bromide is added in droplets. After the dropwise addition is completed, the mixture is stirred at 10°–15° C. for 1 hour and then, adjusted to pH about 8.5 with an aqueous solution of sodium hydroxide. The benzene layer is separated, washed with 3 portions of water, dried over sodium sulfate and concentrated under reduced pressure. Finally, ether is added to the concentrate, whereupon 4-bromoacetyl - 3,4 - dihydro-1,8-dimethyl-6-phenyl-1,4,5-benzotriazocin-2(1H)-one is obtained as white crystals. Recrystallization from chloroform-n-hexane gives crystals melting at 189°–191° C. Elementary analysis: Calcd. for $C_{19}H_{18}BrN_3O_2$ (percent): C, 57.01; H, 4.53; N, 10.50. Found (percent): C, 56.80; H, 4.49; N, 10.11.

What we claim is:
1. A compound of the formula:

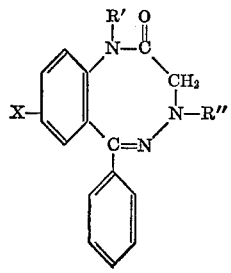

wherein X is a member selected from the class consisting of hydrogen, halogen and lower alkyl groups; R' is a member selected from the class consisting of hydrogen and lower alkyl groups; and R" is a member selected from the class consisting of hydrogen, —COCH$_2$Y and —COCH$_2$A in which Y is halogen and A is selected from the class consisting of hexamethylenetetramino; morpholino; piperazino; piperidino; pyrrolidino; benzylamino; phenylethylamino; phenylamino– mono- or di-substituted phenylamino wherein the substituent is a member selected from the class consisting of methyl, ethyl, methoxy and chlorine; diallylamino; mono- or di-lower-alkylamino wherein said lower alkyl is selected from the class consisting of methyl and ethyl; and phenylhydrazino 2. A compound in accordance with claim 1 of the formula:

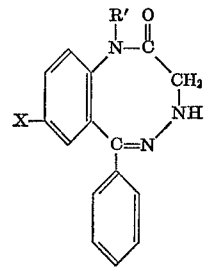

wherein X is selected from the class consisting of hydrogen, halogen and lower alkykl groups; and R' is selected from the class consisting of hydrogen and lower alkyl groups.

3. A compound in accordance with claim 1 of the formula:

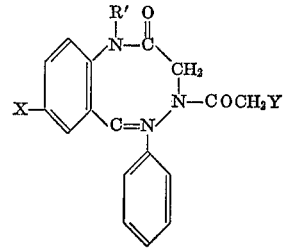

wherein X is a member selected from the class consisting of hydrogen, halogen and lower alkyl groups; R' is a member selected from the class consisting of hydrogen and lower alkyl groups; and Y is halogen.

4. A compound in accordance with claim 1 wherein R" is —COCH$_2$A, wherein A is as defined in claim 1.

No references cited.

NORMA S. MILESTONE, Primary Examiner

R. T. BOND, Assistant Examiner

U.S. Cl. X.R.

424—244, 248, 249, 250, 251, 267, 274

UNITED STATES PATENT OFFICE
CERTIFICATE OF CORRECTION

Patent No. 3,838,117   Dated September 24, 1974

Inventor(s) Minoru Shindo et al

It is certified that error appears in the above-identified patent and that said Letters Patent are hereby corrected as shown below:

Column 1, between lines 8 and 9, insert --, and March 23, 1972, 47/28,556, 47/28,557 and 47/28,558--

Column 2, line 10, should read --8-Chloro-3,4-dihydro-1-methyl-6-phenyl-4-bromo- - -

" " line 11, should read --azocin-4-yl)carbonylmethyl](di-allyl)methyl- - -

Column 4, line 39, delete "the"
" " line 40, delete "including organic amines, aocoholates ammonia and"

Column 10, line 72, "dissolvetd" should read --dissolved--

Column 12, line 14, delete "11.94" and insert therefor --12.94--
" " line 26, delete "11.10" and insert therefor --12.10--

Column 16, line 5, "$C_{21}H_{21}N_4O_2$" should read --$C_{21}H_{22}N_4O_2$--

" " line 34, "$cm^1$" should read --$cm^{-1}$--

Column 18, line 53, "100°" should read --10°--

Column 19, line 22, "temperatuer" should read --temperature--
" " line 69, "chloroformhexane" should read --chloroform-hexane--

Column 22, line 9, insert --;-- after "phenylamino-"

UNITED STATES PATENT OFFICE
CERTIFICATE OF CORRECTION

Page 2

Patent No. 3,838,117                    Dated September 24, 1974

Inventor(s) Minoru Shindo et al

It is certified that error appears in the above-identified patent and that said Letters Patent are hereby corrected as shown below:

- page 2 -

Column 22, line 14, insert --.-- at the end of the line
"       "  line 32, "alkykl" should read --alkyl--
"       22, line 40, the formula of claim 3 should read as follows:

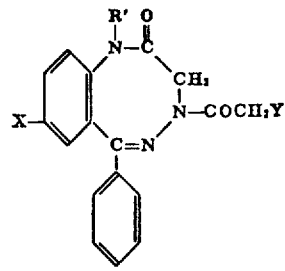

Signed and sealed this 15th day of April 1975.

(SEAL)
Attest:

RUTH C. MASON
Attesting Officer

C. MARSHALL DANN
Commissioner of Patents
and Trademarks